(12) United States Patent
Sauvonnet

(10) Patent No.: US 7,131,349 B2
(45) Date of Patent: Nov. 7, 2006

(54) DEVICE FOR ACTUATING A GEARBOX AND PULSE CONTROL METHOD

(75) Inventor: Franck Sauvonnet, Fontenay Sous Bois (FR)

(73) Assignee: Peugeot Citroen Automobiles S.A., Neuilly-sur-Seine (FR)

( * ) Notice: Subject to any disclaimer, the term of this patent is extended or adjusted under 35 U.S.C. 154(b) by 605 days.

(21) Appl. No.: 10/380,527

(22) PCT Filed: Oct. 30, 2001

(86) PCT No.: PCT/FR01/03371

§ 371 (c)(1),
(2), (4) Date: Sep. 9, 2003

(87) PCT Pub. No.: WO02/36993

PCT Pub. Date: May 10, 2002

(65) Prior Publication Data

US 2004/0045391 A1   Mar. 11, 2004

(30) Foreign Application Priority Data

Nov. 6, 2000  (FR) .................................. 00 14191

(51) Int. Cl.
 *G05G 1/04* (2006.01)
(52) U.S. Cl. .............................. 74/525; 74/544; 74/546

(58) Field of Classification Search .................. 74/525, 74/544, 546, 547, 473.1
See application file for complete search history.

(56) References Cited

U.S. PATENT DOCUMENTS

| 5,992,261 | A | 11/1999 | Iwata et al. | |
| 7,000,497 | B1 * | 2/2006 | Campbell et al. | 74/525 |
| 2003/0079564 | A1 * | 5/2003 | Thiengtham | 74/525 |

FOREIGN PATENT DOCUMENTS

| EP | 0 624 741 A1 | 11/1994 |
| EP | 0 911 548 A2 | 4/1999 |
| JP | 07-309147 | 11/1995 |

* cited by examiner

*Primary Examiner*—David Fenstermacher
(74) *Attorney, Agent, or Firm*—Leydig, Voit & Mayer, Ltd.

(57) ABSTRACT

The invention concerns a device for actuating a gearbox, in particular controllable by pulse control, the device comprising a housing and a lever mounted oscillating in the housing, and the lever being selectively activated via a knob movable along a first direction between two extreme transitory positions located on either side of a neutral position. The lever is slidably mounted relative to a housing along a second direction substantially perpendicular to the first direction, and the lever selectively adopts an active position wherein it projects outside the housing, and an inactive position wherein it is retracted inside the housing.

14 Claims, 3 Drawing Sheets

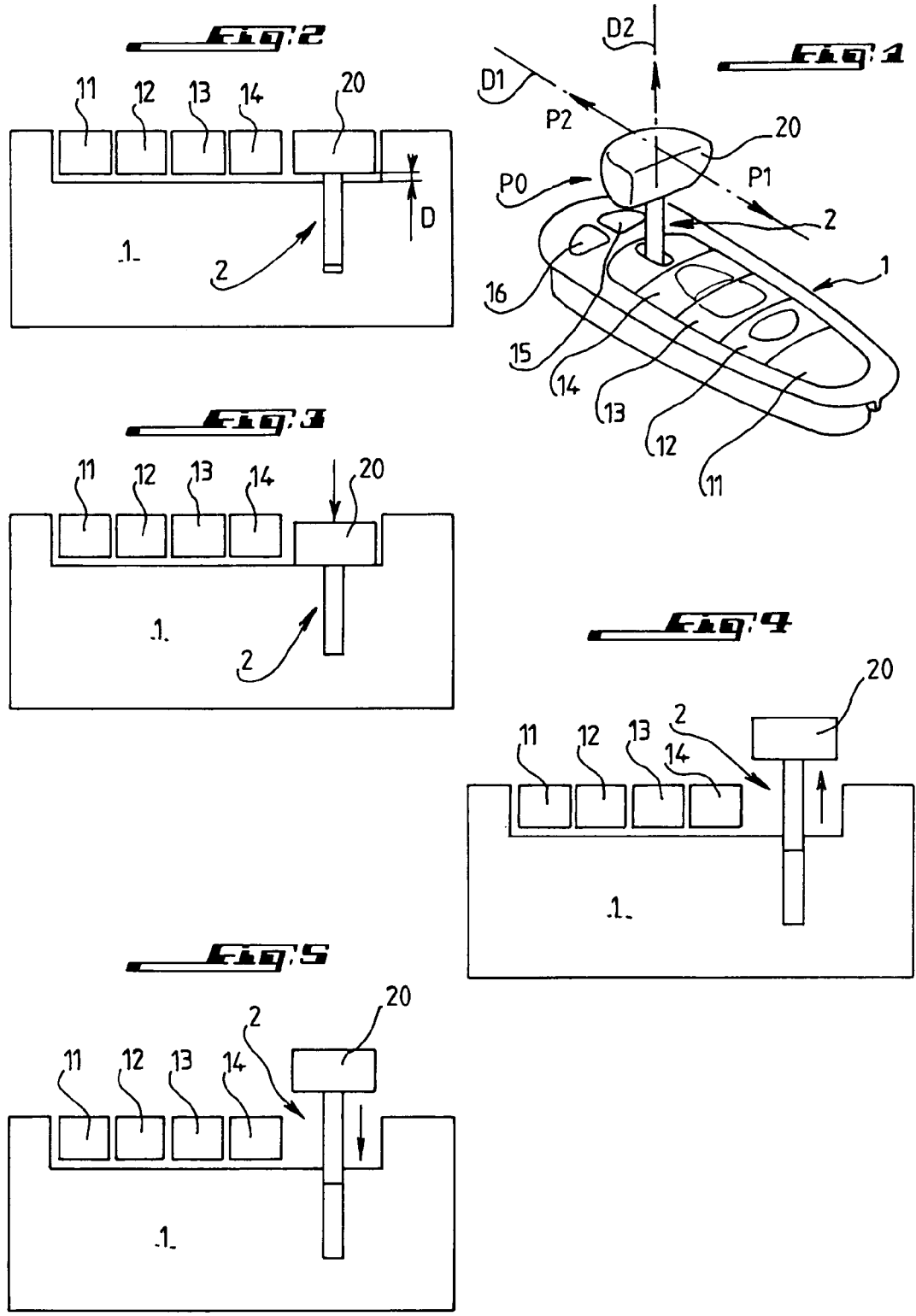

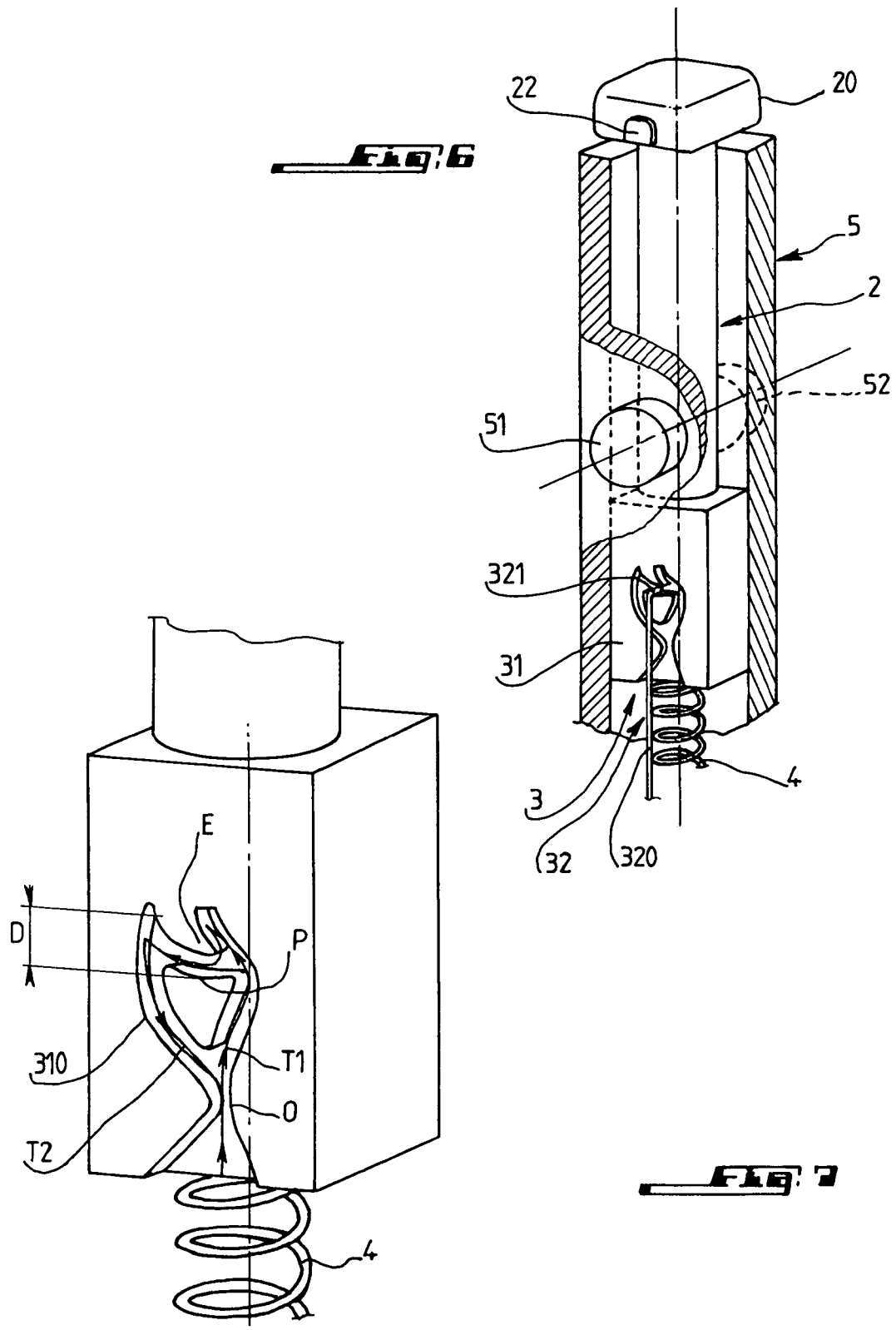

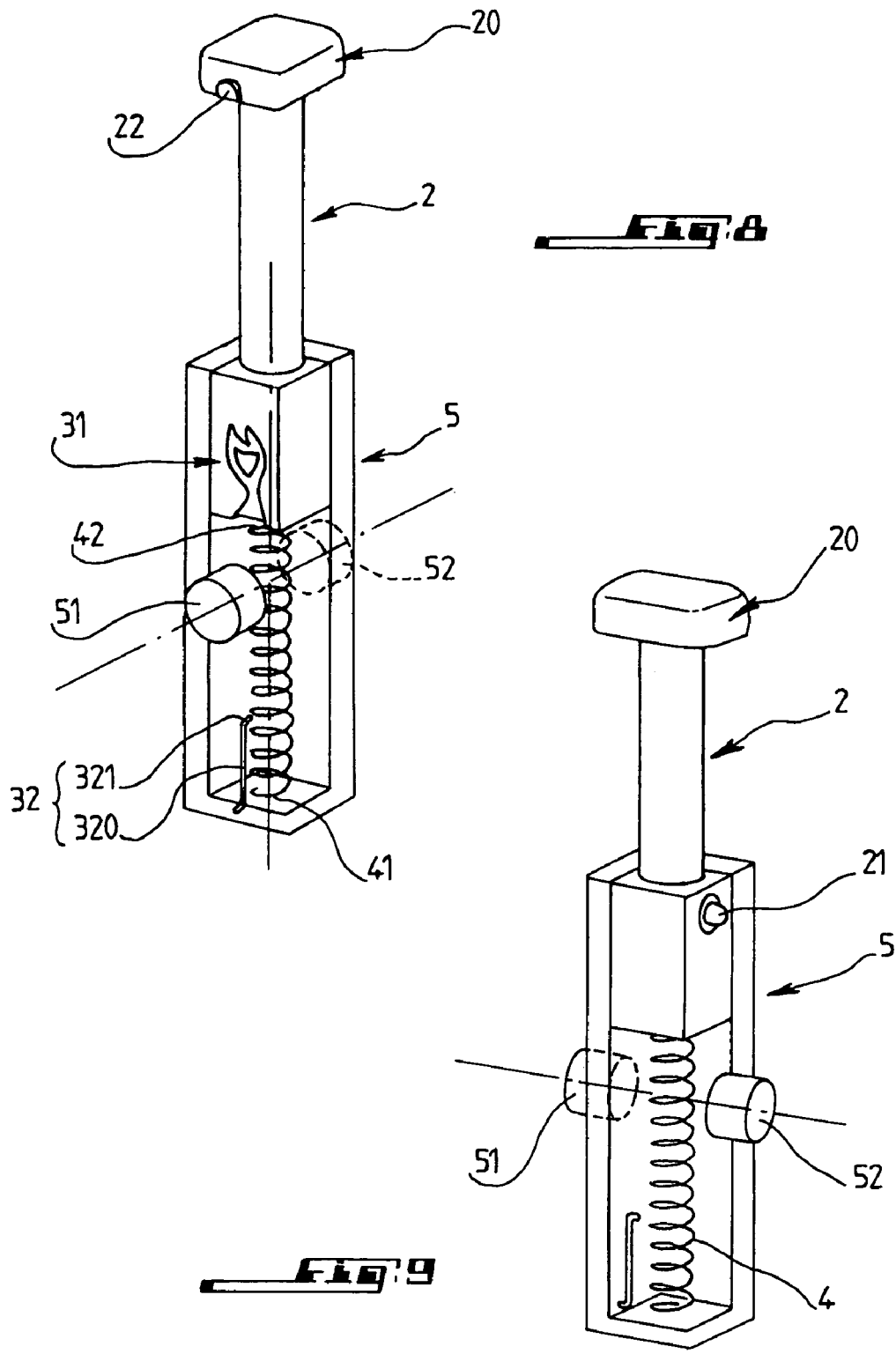

DEVICE FOR ACTUATING A GEARBOX AND PULSE CONTROL METHOD

The present invention concerns, in general, transmission control systems for automobiles.

More precisely, the invention, according to one of its features, concerns a device for actuating an automobile transmission, controlled at least by pulse control, where the device has a housing and a lever mounted to oscillate in the housing, and where the lever is selectively actuated by means of a knob that can be shifted, according to a first direction, between two extreme transitional positions located on either side of a neutral position.

Although pulse-controlled transmissions have been used for a long time in motorcycles, their extensive use in automobiles is more recent, both because of the amount of power to be transmitted and the persistent infatuation of automobile drivers with the standard mechanical transmissions.

In any case, the installation of a pulse-controlled transmission actuation device in an automobile poses specific problems which are completely different from those which can arise from such an installation in a two-wheeled vehicle.

On the one hand, such a device must work out the compromise of being easily accessible but at the same time as unobtrusive as possible in order not to impede the movements of the passengers in the front of the passenger space.

On the other hand, inasmuch as the selection lever must be connected very reliably to the internal selection components of the transmission, it is extremely desirable for this lever not to undergo any impact which can degrade the reliability.

The invention, which is situated in this context, mainly aims to propose a device for actuation of a transmission which is capable of meeting the needs described above.

For this purpose, the device of the invention, in other respects according to the generic definition given for it in the introduction above, is essentially characterized by the fact that the lever is mounted so that it can slide, relative to the housing, along a second direction essentially perpendicular to the first, and by the fact that this lever selectively adopts, along the second direction, an active position in which it projects from the housing, and an inactive position in which it is retracted within the housing.

In a preferred embodiment, this device comprises a latch and a spring, the latch being formed of a first part and a second part, one of which is connected to the housing and the other to the lever, and the spring is compression prestressed at least in the inactive position of the lever and has a first end which is stationary with respect to the housing and a second end which is stationary with respect to the lever.

For example, the first part of the latch then has at least one cam-shaped groove, and the second part of the latch has a flexible hook with a finger engaged in the cam when the first and second parts of the latch go from a relative unlocking position to a relative locking position, and is disengaged from the cam when the first and second parts of the latch go from a relative locking position to a relative unlocking position.

In this case, it is advantageous on the one hand, if the cam offers the finger a first or a second path of circulation according to whether the first and second parts of the latch are brought closer together from their relative unlocking position or from their relative locking position, and on the other hand, if the first path ends in a trap which captures the finger, and finally that the second path ends with an opening of the cam, allowing the finger to escape from it.

These characteristics can be obtained in particular by giving the cam an asymmetrical profile, and by providing that the opening of the cam form an entrance of the first path and an outlet of the second path.

Thanks to the arrangement of the invention, the knob can itself be retracted in the housing for the inactive position of the lever.

In all cases, the device of the invention can have a guide in which the lever is mounted so as to slide, this guide itself being mounted so as to oscillate in the housing.

The device of the invention can moreover make it possible to operate a transmission according to a pulse mode or according to an automatic mode.

In this case, this device can have selection keys mounted in the housing and which selectively control respective states of the transmission when the lever is in its inactive position, the transmission then functioning in automatic mode.

According to a second feature, the invention relates to a process which uses a device as defined in the preceding in order to actuate an automobile transmission, where this transmission adopts an instantaneous gear ratio selected from an ordered series of different gear ratios, and where this process is characterized by the fact that it includes a first control operation, executed in response to a shifting of the lever, bringing the knob to a first of its two extreme transitional positions, and consisting of shifting the transmission from its instantaneous gear ratio to that of its different gear ratios which follows the instantaneous gear ratio in the ordered series of the different gear ratios, and a second control operation, executed in response to a shifting of the lever, bringing the knob to a second of its two extreme transitional positions, and consisting of shifting the transmission from its instantaneous gear ratio to that of its different gear ratios which precedes the instantaneous gear ratio in the ordered series of the different gear ratios.

As a variant, the process of the invention, which uses a device as described in the preceding in order to actuate an automatic transmission which adopts an instantaneous state selected from an ordered series of different states, can include a first control operation, executed in response to a shifting of the lever, bringing the knob to a first of its two extreme transitional positions, and consisting of the shifting the transmission from its instantaneous state to that of its different states which follows the instantaneous state in the ordered series of different states, and a second control operation, executed in response to a shifting of the lever, bringing the knob to a second of its two extreme transitional positions, and consisting of shifting the transmission from its instantaneous state to that of its different states which precedes the instantaneous state in the ordered series of different states.

Other characteristics and advantages of the invention will emerge clearly from the description given hereafter on an indicative and purely non-limiting basis, in reference to the appended drawings in which:

FIG. 1 is an external perspective view of the device according to the invention, the lever being represented in the active position;

FIG. 2 is a cross section of the device of FIG. 1, the lever being represented in the inactive position;

FIG. 3 is a cross section similar to FIG. 2, the lever being represented in a transitional state between its inactive position and its active position;

FIG. 4 is a cross section similar to FIG. 3, the lever being represented approaching its active position;

FIG. 5 is a cross section similar to FIG. 4, the lever being represented pushed towards its inactive position;

FIG. 6 is a half-exposed perspective view showing the lever in the inactive position, and the first and second parts of the latch in their relative locking position;

FIG. 7 is an enlarged perspective view of the first part of the latch;

FIG. 8 is a perspective view of the lever, represented in the active position, and of the latch whose first and second parts are represented in their relative unlocking position; and FIG. 9 is a view similar to FIG. 8, showing the lever in perspective at a different angle.

The invention generally concerns a device enabling one to actuate a transmission equipped in an automobile and capable of being controlled at least by pulse control, this device essentially including housing 1 and lever 2.

Lever 2, which can be grasped and maneuvered by means of knob 20 connected with it, is mounted so as to slide in guide 5 housed inside of housing 1.

Guide 5 has, for example, two pivot pins 51 and 52, thanks to which it is mounted so as to oscillate in housing 1 about the common axis of these pivot pins.

As shown in FIG. 1, knob 20 of lever 2 can thus be shifted according to a direction D1 which is transverse with respect to the axis of pivot pins 51 and 52, between two extreme transitional positions, P1 and P2, situated on either side of a neutral or rest position P0.

Sensors (not represented) mounted in housing 1, and for example, consisting simply of electrical contactors, make it possible to detect, by discriminating one from the other, a movement of the lever temporarily bringing the knob to its position P1 and a movement of the lever temporarily bringing the knob to its position P2.

Thanks to a known processing logic circuit and not part of the invention, it is thus possible to make it so that a shifting of the knob from position P0 to position P1 makes it possible to engage a higher gear ratio, and so that a shifting of the knob from position P0 to position P2 makes it possible to engage a lower gear ratio, that is to say to shift down.

According to the invention, lever 2 is mounted so as to slide with respect to housing 1 according to a second direction D2 essentially perpendicular to direction D1, and for example, a vertical direction.

In practice, lever 2 is mounted so as to slide in guide 5 and adopts as desired, according to the vertical D2, and active position, as illustrated in FIG. 1 and in which it projects out of housing 1, and an inactive position, as illustrated in FIG. 2 and in which it is retracted in housing 1, with it possible for knob 20 itself then to be brought into housing 1.

For this purpose, the actuation device of the invention essentially has latch 3 and spring 4.

Latch 3 is formed by two parts, 31 and 32 (FIG. 6), the first of which is, for example, connected with lever 2 and the second of which is connected with housing 1.

Furthermore, spring 4 is pre-compressed and has lower end 41 which is stationary with respect to housing 1, and upper end 42 which is stationary with respect to lever 2.

First part 31 of the latch (FIGS. 6 and 7) has groove 310 in the form of a cam, whose shape will be specified later.

Second part 32 of the latch has flexible hook 320 ending with curved finger 321.

When first and second parts 31 and 32 of latch 3 are brought closer together from their relative unlocking position represented in FIGS. 1, 5 and 8, finger 321 is engaged in opening O (FIG. 7) of cam shaped groove 310, where it follows a path T1 which leads to trap P.

Although this movement increases the compression of spring 4, at the end of this movement, finger 321 is caught in trap P, so that the first and second parts 31 and 32 remain relatively close to one another, and the lever remains locked in position retracted in the housing (FIGS. 2 and 6).

When, on the other hand, the first and second parts 31 and 32 of latch 3 are brought closer together (FIG. 3) from their relative locking position represented by FIG. 2, finger 321 is deflected by stop E and follows, in cam-shaped groove 310, a path of circulation T2 which brings it to opening O of the cam and allows it to escape from this groove 310.

As shown in FIG. 7, paths T1 and T2 must be differentiated in order to force finger 321 to adopt the first path T1 during passage of parts 31 and 32 of latch 3 from their relative unlocking position to their relative locking position, and to adopt second path T2 during the opposite movement of parts 31 and 32 of latch 3, so that cam-shaped groove 310 has an asymmetric profile.

Furthermore, the lever, in its inactive position, must have, with respect to the housing, a clearance at least equal to distance D separating trap P from the top of path T2, so as to be able to return to its active position.

Additional locking components, such as pin 21 (FIG. 9) controlled by button 22 (FIG. 6), can be provided for immobilizing the lever in its active position and thus avoiding its accidental return to the inactive position.

Depending on its constitution and its environment, the device of the invention allows various modes of transmission control.

For example, if lever 2 constitutes the only selection component of the device of the invention, the latter can be used to control, in pulse form, the gear ratios of a pulse-controlled mechanical transmission.

In this case, as indicated in the preceding, the shifting of knob 20 towards the front (position P2 in FIG. 1) allows one to go from one gear ratio to a higher gear ratio, for example, from first to second, while the shifting of knob 20 towards the rear (position P1 in FIG. 1) allows one to down shift, that is, to go from one gear ratio to a lower gear ratio, for example, from fifth to fourth, where it is possible for the effects of the shifting of the knob towards the front and towards the rear to be reversed by adjustment, if necessary.

However, lever 2, if it constitutes the only selection component of the device of the invention, can also be used to control, in pulse form, the states of an automatic transmission.

It is known, in effect, that an automatic transmission is capable of assuming several states, namely "Park" (generally noted "P"), "Reverse" (generally noted "R"), "Neutral" (generally noted "N"), and "Drive" (generally noted "D").

In this case, the shifting of knob 20 towards the front (position P2 in FIG. 1) makes it possible to control the switching of the transmission from one state to a higher state, for example, from "P" to "R," while the shifting of knob 20 towards the rear (position P1 in FIG. 1) makes it possible to control the switching of the transmission from one state to a lower state, for example, from "D" to "N," where it is possible for the effects of the shifts of the knob towards the front and towards the rear to be reversed by adjustment, if necessary.

However, the device of the invention can also include selection keys such as 11 to 14 mounted in housing 1 and selectively controlling respective states "P," "R," "N," and "D" of the transmission when lever 2 is in its inactive position.

In this case, a sensor (not represented), for example, consisting of an electrical contactor is arranged in the housing in order to detect whether the lever is in active position or inactive position.

When lever 2 is in active position, the transmission is put in an operating mode in which the gear ratios can be controlled in a pulse manner by this lever 2.

When lever 2 is in inactive position, the transmission is put in its automatic operating mode, and its states "P," "R," "N," and "D" are controlled by actuation of the respective selection keys 11 to 14.

Finally, the device of the invention can include other selection keys mounted in housing 1, such as keys 15 and 16, in order to control various supplementary functions, such as the driving style (casual driving, highway driving, driving on snow, etc.).

The invention claimed is:

1. An actuation device for actuating an automobile transmission controlled at least by pulse control comprising
   a housing, and a lever mounted so as to oscillate in the housing, the lever being selectively actuated by means of a knob which can be shifted, according to a first direction, between two extreme transitional positions situated on either side of a neutral position, wherein the lever is mounted so as to slide, relative to the housing, along a second direction essentially perpendicular to the first direction, and the lever selectively adopts, according to the second direction, an active position in which it projects from the housing, and an inactive position in which it is retracted in the housing.

2. The device according to claim 1, including a latch and a spring, the latch including a first part and a second part, one of the first part and the second part being connected to the housing, and the other of the first part and the second part being connected to the lever, wherein the spring has a first end which is stationary with respect to the housing and a second end which is stationary with respect to the lever, the spring being precompressed at least in the inactive position of the lever.

3. The device according to claim 2, wherein the first part of the latch has at least one cam-shaped groove, and the second part of the latch has a flexible hook including a finger which is engaged in a cam when the first part and the second part of the latch move from a relative unlocking position to a relative locking position, and which is disengaged from the cam when the first part and the second part of the latch move from a relative locking position to a relative unlocking position.

4. The device according to claim 3, wherein the cam allows the finger to pass along a first circulation path or a second circulation path according to whether the first part and second part of the latch are brought closer together from their relative unlocking position or brought closer together from their relative locking position, wherein the first path ends at a trap which catches a finger, and the second path ends with an opening, allowing the finger to escape therefrom.

5. The device according to claim 4, wherein the cam has an asymmetric profile, and the opening forms an entrance of the first path and an outlet of the second path.

6. The device according to claim 1, wherein the knob is retracted in the housing when the lever is in the inactive position.

7. The device according to claim 1, including a guide in which the lever is slidably mounted, the guide being mounted so as to oscillate in the housing.

8. The device according to claim 1, including selection keys mounted in the housing which selectively control the respective states of the transmission when the lever is in the inactive position, the transmission then functioning in an automatic mode.

9. A process of using the device according to claim 1 to actuate an automobile transmission, the transmission adopting an instantaneous gear ratio selected from an ordered series of different gear ratios, the process including a first control operation, executed in response to a shifting of the lever bringing the knob to a first of two extreme transitional positions, and consisting of shifting the transmission from its instantaneous gear ratio to that of its different gear ratios which follows the instantaneous gear ratio in the ordered series of the different gear ratios, and a second control operation, executed in response to a shift of the lever bringing the knob to a second of its two extreme transitional positions, and consisting of shifting the transmission from its instantaneous gear ratio to that of its different gear ratios which precedes the instantaneous gear ratio in the ordered series of the different gear ratios.

10. A process of using the device according to claim 1 to actuate an automatic transmission, the transmission adopting an instantaneous state selected from an ordered series of different states, the process including a first control operation, executed in response to a shifting of the lever bringing the knob to a first of two extreme transitional positions, and consisting of shifting the transmission from its instantaneous state to that of its different states which follows the instantaneous state in the ordered series of different states, and a second control operation, executed in response to a shifting of the lever bringing the knob to a second of two extreme transitional positions, and consisting of shifting the transmission from its instantaneous state to that of its different states which precedes the instantaneous state in the ordered series of different states.

11. The device according to claim 2, wherein the knob is retracted in the housing when the lever is in the inactive position.

12. The device according to claim 2, including a guide in which the lever is slidably mounted, the guide being mounted so as to oscillate in the housing.

13. The device according to claim 2, including selection keys mounted in the housing which selectively control the respective states of the transmission when the lever is in the inactive position, the transmission then functioning in an automatic mode.

14. The device according to claim 11, including a guide in which the lever is slidably mounted, the guide being mounted so as to oscillate in the housing.

* * * * *